(12) United States Patent
Jung et al.

(10) Patent No.: US 9,042,258 B2
(45) Date of Patent: May 26, 2015

(54) METHOD FOR PERFORMING LIMITED MEASUREMENT IN WIRELESS COMMUNICATION SYSTEM AND APPARATUS SUPPORTING SAME

(75) Inventors: Sung Hoon Jung, Anyang-si (KR); Seung June Yi, Anyang-si (KR); Young Dae Lee, Anyang-si (KR); Sung Duck Chun, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 206 days.

(21) Appl. No.: 13/882,701

(22) PCT Filed: Nov. 1, 2011

(86) PCT No.: PCT/KR2011/008258
§ 371 (c)(1),
(2), (4) Date: Apr. 30, 2013

(87) PCT Pub. No.: WO2012/060613
PCT Pub. Date: May 10, 2012

(65) Prior Publication Data
US 2013/0229938 A1    Sep. 5, 2013

Related U.S. Application Data

(60) Provisional application No. 61/409,072, filed on Nov. 1, 2010.

(51) Int. Cl.
| | |
|---|---|
| *H04L 1/00* | (2006.01) |
| *H04L 12/26* | (2006.01) |
| *H04L 12/28* | (2006.01) |
| *H04W 24/10* | (2009.01) |
| *H04J 11/00* | (2006.01) |
| *H04W 72/08* | (2009.01) |
| *H04W 24/02* | (2009.01) |

(52) U.S. Cl.
CPC .............. *H04W 24/10* (2013.01); *H04J 11/005* (2013.01); *H04W 24/02* (2013.01); *H04W 72/082* (2013.01); *H04J 2211/001* (2013.01)

(58) Field of Classification Search
CPC ......... H04L 47/10; H04L 43/50; H04L 41/12; H04L 45/02
USPC .................................. 370/252, 254
See application file for complete search history.

(56) References Cited

U.S. PATENT DOCUMENTS

2009/0247084 A1* 10/2009 Palanki ................ 455/63.1
2010/0135235 A1   6/2010 Ji et al.

FOREIGN PATENT DOCUMENTS

| JP | 2009-177627 | 8/2009 |
| KR | 10-2007-0108426 | 11/2007 |
| WO | 2010-104436 | 9/2010 |

*Primary Examiner* — Ronald B Abelson
(74) *Attorney, Agent, or Firm* — Lee, Hong, Degerman, Kang & Waimey

(57) ABSTRACT

Provided is a method for measuring, which is performed by a user equipment in a wireless communication system. The method for measuring comprises the following steps: receiving from a serving cell a report request message on measured resource limitation; attempting to acquire the information on the measured resource limitation; and transmitting the report request message on the measured resource limitation including the information on the measured resource limitation to the serving cell; receiving from the serving cell the measured resource limitation setting; and performing the limited measurement, when the information on the measured resource limitation is successfully acquired.

19 Claims, 11 Drawing Sheets

METHOD FOR PERFORMING LIMITED MEASUREMENT IN WIRELESS COMMUNICATION SYSTEM AND APPARATUS SUPPORTING SAME

CROSS-REFERENCE TO RELATED APPLICATIONS

This application is the National Stage filing under 35 U.S.C. 371 of International Application No. PCT/KR2011/008258, filed on Nov. 1, 2011, which claims the benefit of U.S. Provisional Application Ser. No. 61/409,072, filed on Nov. 1, 2010, the contents of which are all hereby incorporated by reference herein in their entirety.

TECHNICAL FIELD

The present invention concerns wireless communications, and more specifically, to a method of avoiding interference from a serving cell and other cells and performing restricted measurement in a wireless communication system and an apparatus supporting the same.

BACKGROUND ART $3^{rd}$ Generation Partnership Project (3GPP) Long Term Evolution (LTE), an evolution of UMTS (Universal Mobile Telecommunications System), is introduced as 3GPP release 8. 3GPP LTE adopts Orthogonal Frequency Division Multiple Access (OFDMA) for downlink and Single Carrier-Frequency Division Multiple Access (SC-FDMA) for uplink. Multiple Input Multiple Output (MIMO) is employed of having up to four antennas. Recently, an advanced version of 3GPP LTE, 3GPP LTE-advanced (LTE-A), is actively on discussion.

User equipment (UE), while being serviced from a specific cell, may be interfered by radio signals transmitted from another cell. User equipment periodically measures cells and reports a measurement result. In case user equipment performs handover to another cell, it may perform measurement on a neighboring cell as well as a serving cell and may report a result. In measuring the specific cell, interference caused by radio signals from other cells renders it difficult for the user equipment to normally measure the specific cell. This deteriorates mobility of the user equipment in the wireless communication system.

In particular, under the situation where macro cells, pico cells, and femto cells are co-existent, for example, when different service coverage, different frequency channel bands, and different RATs (Radio Access Technologies) serviced by cells, schemes for avoiding interference caused by the cells may be considered more critical.

Inter-cell Interference Coordination (ICIC) is a task that operates radio resources so as to maintain control of inter-cell interference. The ICIC mechanism may be divided into a frequency domain ICIC and a time domain ICIC. The ICIC includes multi-cell Radio Resource Management (RRM) functions that require consideration of information from multi-cells.

The frequency domain ICIC coordinates use of frequency domain resources (e.g., Resource Block (RB)) between multi-cells. The time domain ICIC coordinates time domain resources (e.g., subframe) between multi-cells.

In the ICIC, depending on targets for which the user equipment performs measurement, targets causing interference (i.e., interfering cell) and targets damaged by interference (i.e., interfered cell) are determined.

Meanwhile, in a communication environment with severe interference, a network may have a difficulty in transferring an optimal measurement configuration to the user equipment. The user equipment may apply a common measurement configuration in a normal environment and may apply another measurement configuration proper for an environment with severe interference in such severely interfered environment. However, receiving a report from the user equipment whenever high interference occurs and transmitting another measurement configuration may cause signaling overhead. To address such problem, there is a need for a method of being able to sense a situation where the user equipment is going to vary the measurement configuration and accordingly may apply the varied measurement configuration on its own.

DISCLOSURE

Technical Problem

An object of the present invention is to provide a method of avoiding interference from a serving cell and other cells in a wireless communication system, more specifically, a method of user equipment detecting a situation where high interference occurs and accordingly performing restricted measurement and an apparatus supporting the method.

Technical Solution

In an aspect, a method of performing measurement by user equipment in a wireless communication system is provided. The method comprises receiving a measurement resource restriction information report requesting message from a serving cell, attempting to obtain measurement resource restriction information, if the measurement resource restriction information is successfully obtained, transmitting a measurement resource restriction information reporting message including the measurement resource restriction information, and receiving a measurement resource restriction configuration from the serving cell and performing restricted measurement.

The measurement resource restriction information report requesting message may include at least one of a cell identity of a target neighboring cell from which the user equipment attempts to obtain the measurement resource restriction information and a frequency indicator of the target neighboring cell; and an obtaining time that may be used to obtain the measurement resource restriction information from a time when the user equipment receives the measurement resource restriction information report requesting message.

If the measurement resource restriction information report requesting message may include only the cell identity of the cell identity and the frequency indicator, attempting to obtain the measurement resource restriction information may include attempting to receive system information of the target neighboring cell indicated by the cell identity at a frequency being used by the serving cell and attempting to obtain the measurement resource restriction information included in the system information.

If the measurement resource restriction information report requesting message may include both the cell identity and the frequency indicator, attempting to obtain the measurement resource restriction information may include attempting to receive system information of the target neighboring cell indicated by the cell identity at a frequency indicated by the frequency indicator and attempting to obtain the measurement resource restriction information included in the system information.

If the measurement resource restriction information report requesting message may include only the frequency indicator of the cell identity and the frequency indicator, attempting to obtain the measurement resource restriction information may include attempting to obtain system information broadcast at a frequency indicated by the frequency indicator and attempting to obtain the measurement resource restriction information included in the system information.

The measurement resource restriction information reporting message may include a cell identity of the target neighboring cell that is a target from which the measurement resource restriction information is obtained; a measured value for the target neighboring cell; a cell type of the target neighboring cell; and if the cell type of the target neighboring cell is a CSG (Closed Subscriber Group) cell, a member indicator indicating whether the user equipment is a member of the target neighboring cell.

Successfully obtaining the measurement resource restriction information may include obtaining the measurement resource restriction information within the obtaining time.

The measurement resource restriction information may include information relating to a time pattern in which the target neighboring cell minimizes transmission and reception of radio signals.

The time pattern may be an ABS (Almost Blank Subframe) pattern formed on a per-subframe basis.

The measurement resource restriction configuration may include the ABS pattern information.

Performing the restricted measurement may include performing the measurement within a predetermined time section based on the ABS pattern information.

Performing the measurement within the time section may include RLM (Radio Link Monitoring) measurement that is performed to monitor connectivity with the serving cell.

The method may further comprise, if obtaining the measurement resource restriction information fails, transmitting, to the serving cell, the measurement resource restriction information reporting message including information indicating that obtaining the information fails.

Failing to obtain the measurement resource restriction information may include failing to obtain the measurement resource restriction information within the obtaining time.

The measurement resource restriction information reporting message further may include information indicating a reason why obtaining the measurement resource restriction information fails.

The method may further comprise transmitting, to a serving cell, an interference detection indicating message indicating that interference caused from a neighboring cell is received, receiving the measurement resource restriction information report requesting message from the serving cell may include receiving the message as a response to the interference detection indicating message.

In another aspect, an apparatus of performing measurement in a wireless communication system is provided. The apparatus comprises an RF (Radio Frequency) unit transmitting and receiving a radio signal and a processor connected to the RF unit, the processor is configured to receive a measurement resource restriction information report requesting message from the serving cell; to attempt to obtain measurement resource restriction information; if the measurement resource restriction information is successfully obtained, to transmit, to the serving cell, a measurement resource restriction information reporting message including the measurement resource restriction information; and to receive measurement resource restriction configuration from the serving cell and to perform restricted measurement.

Advantageous Effects

The serving cell that is not aware of information on measurement resource restriction configured by the neighboring cell receives an interference detection indicating message from the user equipment and sends a request for obtaining measurement resource restriction information to the user equipment. The serving cell receives the measurement resource restriction information from the user equipment and allows the user equipment to perform restricted measurement so that the measurement may be normally performed by the user equipment. The serving cell may provide services to the user equipment through the restricted measurement resources according to the measurement resource restriction information without the service being stopped due to the interference.

MODE FOR INVENTION

Figure 1:
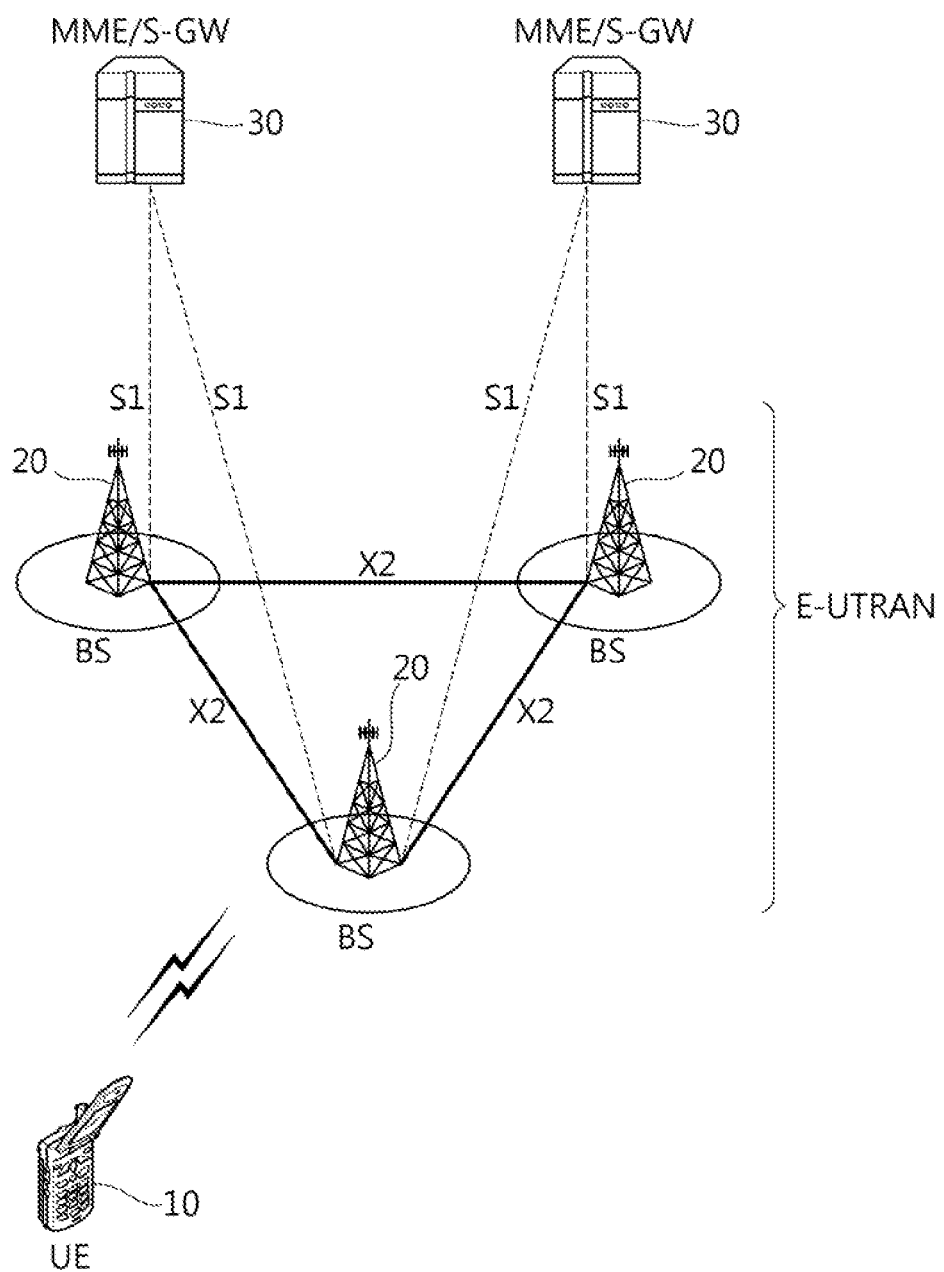
FIG. 1 shows a wireless communication system according to the present invention.

FIG. 1 shows a wireless communication system according to the present invention. This system may be also referred to as Evolved-UMTS Terrestrial Radio Access Network (E-UTRAN) or Long Term Evolution (LTE)/LTE-A system.

The E-UTRAN includes a base station (BS) 20 providing a control plane and a user plane to user equipment (UE) 10. The user equipment 10 may be stationary or mobile and may be also referred to by other terms such as Mobile Station (MS), User Terminal (UT), Subscriber Station (SS), Mobile Terminal (MT), or wireless device. The base station 20 is a fixed station communicating with the user equipment 10 and may be referred to by other terms such as evolved-NodeB (eNB), Base Transceiver System (BTS), or access point.

The base stations 20 may be connected to each other through an $X_2$ interface. The base station 20 is connected to an Evolved Packet Core (EPC) 30 through an S1 interface, more specifically, to an Mobility Management Entity (MME) through an S1-MME and to an Serving Gateway (S-GW) through S1-U.

The EPC 30 consists of an MME, an S-GW, and a Packet Data Network-Gateway (P-GW). The MME has access information of the user equipment or information on the capacity of the user equipment. Such information is mainly used for managing mobility of the user equipment. The S-GW is a gateway having E-UTRAN as its end point, and the P-GW is a gateway having PDN as its end point.

Layers of a radio interface protocol between the user equipment and the network may be divided into an L1 (first layer), an L2 (second layer), and an L3 (third layer) based on lower three layers of an open system interconnection (OSI) reference model well known in the communication system. Among them, the physical layer, which belongs to the first layer, provides an information transfer service using a physical channel, and the Radio Resource Control (RRC) layer positioned in the third layer controls radio resources between the user equipment and the network. For this, the RRC layer exchanges RRC messages between the user equipment and the base station.

Figure 2:
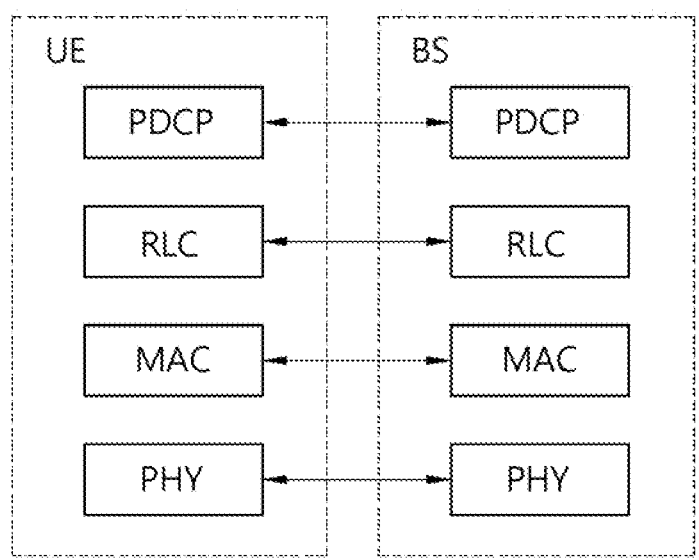
FIG. 2 is a block diagram illustrating a radio protocol architecture for a user plane.
Figure 3:
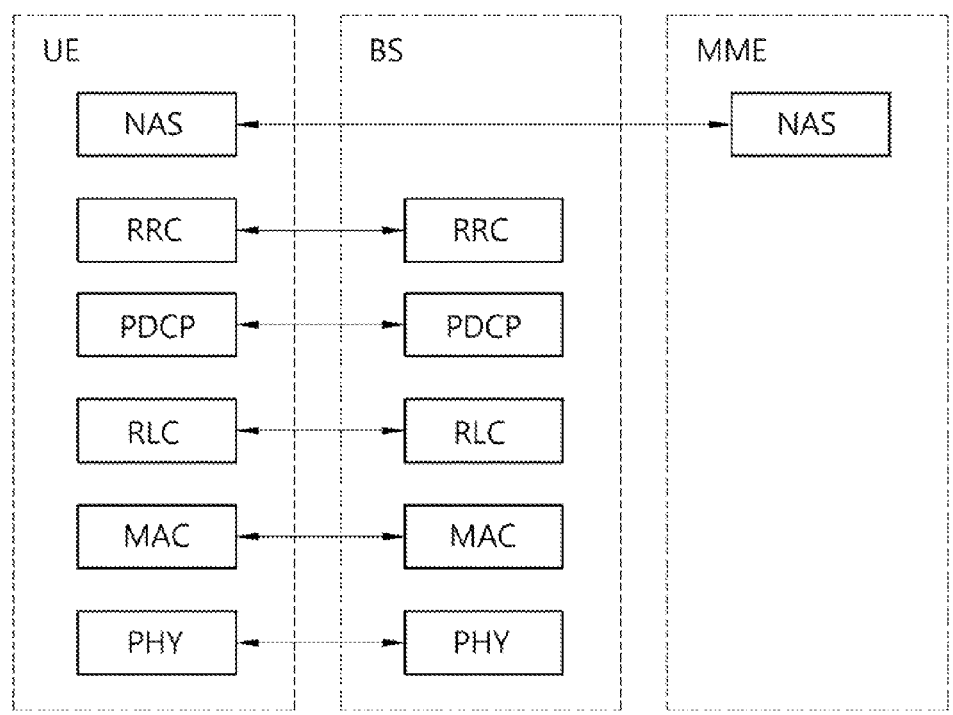
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The data plane is a protocol stack for user data transmission, and the control plane is a protocol stack for control signal transmission.

Referring to FIGS. 2 and 3, the physical (PHY) layer provides an information transfer service to an upper layer using a physical channel. The physical channel is connected to an Medium Access Control (MAC) channel, an upper layer, via a transport channel. Data flows between the MAC layer and the physical layer through the transport channel. The transport channel is divided depending on characteristics in which data is transmitted through a radio interface.

Data flows through the physical channel between different physical layers, i.e., between the physical layer of a transmitter and the physical layer of a receiver. The physical channel may be modulated in the Orthogonal Frequency Division Multiplexing (OFDM) scheme and uses time and frequency as radio resources.

The functions of the MAC layer include mapping between the logical channel and the transport channel and multiplexing/de-multiplexing to a transport block provided through the physical channel over the transport channel of an MAC Service Data Unit (SDU) belonging to the logical channel. The MAC layer provides services to the Radio Link Control (RLC) layer through the logical channel.

The functions of the RLC layer include concatenation, segmentation and reassembly of the RLC SDU. To guarantee various Quality of Service (QoS) demanded by a radio bearer (RB), the RLC layer provides three operation modes including a transparent mode (TM), an unacknowledged mode (UM), and an acknowledged mode (AM). The AM RLC corrects errors through an Automatic Repeat Request (ARQ).

In the user plane, the functions of the PDCP (Packet Data Convergence Protocol) layer include transfer of user data, header compression, and ciphering. In the user plane, the functions of the Packet Data Convergence Protocol (PDCP) layer include transfer, and ciphering/integrity protection of the control plane data.

The Radio Resource Control (RRC) layer is defined only in the control plane. The RRC layer is associated with configuration, re-configuration, and release of radio bearers (RBs) and is in charge of control of the logical channel, transport channel, and physical channel. The RB means a logical path provided by the first layer (PHY layer) and the second layer (MAC layer, RLC layer, and PDCP layer) for data transfer between the user equipment and the network.

RB being configured means a process of specifying the characteristics of the radio protocol layer and channel and configuring each specific parameter and operation method so as to provide a specific service. The RB may be divided into two including an Signaling RB (SRB) and a Data RB (DRB).

The SRB is used as a path for transmitting an RRC message on the control plane, and the DRB is used as a path for transmitting user data on the user plane.

If an RRC connection is established between the user equipment's RRC layer and the E-UTRAN's RRC layer, the user equipment is left in the RRC connected state, and the user equipment otherwise remains in the RRC idle state.

Downlink transport channels transmitting data from the network to the user equipment include a Broadcast Channel (BCH) transmitting system information and a downlink Shared Channel (SCH) transmitting other user traffic or control messages. Downlink multicast or broadcast service traffic or control messages may be transmitted through the downlink SCH or through a separate downlink Multicast Channel (MCH). Meanwhile, uplink transport channels transmitting data from the user equipment to the network include an Random Access Channel (RACH) transmitting initial control messages and an uplink Shared Channel (SCH) transmitting other user traffic or control messages.

As logical channels that are positioned over the transport channel and that are mapped to the transport channel, there are Broadcast Control Channel (BCCH), Paging Control Channel (PCCH), Common Control Channel (CCCH), Multicast Control Channel (MCCH), and Multicast Traffic Channel (MTCH).

The physical channel consists of several OFDM symbols in the time domain and a few sub-carriers in the frequency domain. One sub-frame is constituted of a plurality of OFDM symbols in the time domain. The resource block is a basis for resource allocation and consists of a plurality of OFDM symbols and a plurality of sub-carriers. Further, each sub-frame may use specific sub-carriers of specific OFDM symbols (e.g., first OFDM symbol) of the corresponding sub-frame for Physical Downlink Control Channel (PDCCH), i.e., L1/L2 control channel. Transmission Time Interval (TTI) is a basis time for sub-frame transmission.

An RRC state and an RRC connecting method of user equipment are hereinafter described in detail.

The RRC state means whether the RRC layer of user equipment is in logical connection with the RRC layer of E-UTRAN, and when connected, it is referred to as being in the RRC connected state, or unless connected, it is referred to as being in the RRC idle state. Since in the RRC connected state the user equipment has an RRC connection, E-UTRAN may grasp the existence of the corresponding user equipment on a per-cell basis and accordingly may effectively control the user equipment. On the contrary, the user equipment, when being in the RRC idle state, may not be grasped by E-UTRAN and is managed by a CN (Core Network) on the basis of a tracking area that is larger in area than the cell. That is, when the user equipment is in the RRC idle state, what is grasped on the user equipment is only whether the user equipment is existent or not on a per-large area basis, and for normal mobile services such as voice or data service to be provided, shift should be done to the RRC connected state.

When a user first powers on the user equipment, the user equipment initially explores a proper cell and then stays in the RRC idle state in the corresponding cell. The user equipment being in the RRC idle state establishes an RRC connection with the E-UTRAN through an RRC connection procedure when the user equipment needs to make an RRC connection and shifts to the RRC connected state. Examples of when the user equipment being in the RRC idle state needs to make an RRC connection include when uplink data transmission is required, e.g., due to a user's attempt to call or when transmitting a response message in response to receiving a paging message from the E-UTRAN.

The Non-Access Stratum (NAS) layer positioned over the RRC layer performs functions such as session management and mobility management.

To manage mobility of the user equipment in the NAS layer, two states, EPS Mobility Management-REGISTERED (EMM-REGISTERED) and EMM-DEREGISTERED, are defined, and these two states apply to the user equipment and the MME. Initially, the user equipment is in the EMM-DEREGISTERED state, and the user equipment performs a process of registering itself to the corresponding network through an initial attaching procedure so as to be attached to the network. If the attaching procedure is successfully done, the user equipment and the MME turn into the EMM-REGISTERED state.

To manage signaling connection between the user equipment and the EPC, two states, EPS Connection Management (ECM)-IDLE state and ECM-CONNECTED state, are defined, and these two states apply to the user equipment and the MME. If the user equipment being in the ECM-IDLE state establishes an RRC connection with the E-UTRAN, the corresponding user equipment turns into the ECM-CONNECTED state. The MME being in the ECM-IDLE state, when establishing an S1 connection with the E-UTRAN, turns into the ECM-CONNECTED state. When the user equipment is left in the ECM-IDLE state, the E-UTRAN does not contain context information of the user equipment. Accordingly, the user equipment being in the ECM-IDLE state performs user equipment-based mobility-related procedure such as cell selection or cell reselection without the need of receiving a command from the network. In contrast, when the user equipment is left in the ECM-CONNECTED state, the user equipment's mobility is managed by a command from the network. In case the position of the user equipment when the user equipment is in the ECM-IDLE state is different from the position known to the network, the user equipment informs the position of the user equipment to the network through a tracking area update process.

Next, system information is described.

The system information includes necessary information of which the user equipment should be aware to access the base station. Accordingly, the user equipment should be receiving the whole system information before gaining access to the base station and should always have the up-to-date system information. The system information should be known to all user equipment in one cell, and thus, the base station periodically transmits the system information.

According to chapter 5.2.2. 3GPP TS 36.331 V8.7.0 (2009-09) "Radio Resource Control (RRC); Protocol specification (Release 8)", the system information is divided into Master Information Block (MIB), Scheduling Block (SB), and System Information Block (SIB). MIB allows the user equipment to be aware of physical configuration of the corresponding cell, for example, bandwidth. SB indicates transmission information of SIBs, for example, transmission period. SIB is an aggregate of system information relating to each other. For example, some SIB includes only information on the neighboring cell, and some SIB contains only information on the uplink radio channel used by the user equipment.

In general, services provided from the network to the user equipment may be classified into three types as follows. Further, depending on what services may be provided, the user equipment differently recognizes the type of cell. Service types are first described, followed by cell types.

1) limited service: this service provides an emergency call and an earthquake and Tsunami warning system (ETWS) and may provide it in an acceptable cell.

2) normal service: this service means a general purpose of public service and may be provided from a suitable or normal cell.

3) operator service: this service means a service for communication network service providers and this cell may be used only by a communication network service provider but not by a general user.

In connection with service types provided by cells, cell types may be classified as follows:

1) acceptable cell: cell in which the user equipment may receive limited services. This cell is not barred in the position of the corresponding user equipment and satisfies a cell selection standard of the user equipment.

2) suitable cell: cell in which the user equipment may receive a normal service. This cell satisfies conditions of the acceptable cell and simultaneously meets additional conditions. As the additional conditions, this cell should belong to Public Land Mobile Network (PLMN) to which the corresponding user equipment may be attached and the tracking area update process of the user equipment should not be barred from being carried out. If the corresponding cell is a CSG cell, the cell should be accessible cell to which the user equipment can access as a CSG member.

3) barred cell: this cell broadcasts information that the cell is a barred cell.

4) reserved cell: this cell broadcasts information that the cell is a reserved cell.

Measurement and measurement report are now described.

In the mobile communication system, supporting mobility by the user equipment is essential. Accordingly, the user equipment continuously measures the quality of a serving cell currently providing a service and the quality of a neighboring cell. The user equipment reports a measurement result to the network at a proper time and the network provides the optimal mobility to the user equipment through handover.

The user equipment, in order to provide information that may help a service provider to operate the network besides the purpose of supporting mobility, may perform a measurement of a specific purpose as configured by the network and may report a measurement result to the network. For example, the user equipment receives broadcast information of a specific cell determined by the network. The user equipment may report, to the serving cell, position identification information (e.g., tracking area code) of the position to which the specific cell belongs, and/or other cell information (e.g., whether Closed Subscriber Group (CSG) cell is a member).

The user equipment being on the move, when identifying through the measurement that the quality of a specific area is very poor, may report to the network the position information for the cells of poor quality and the measurement result. The network may be optimized based on the report of the measurement result of user equipment that helps operation of the network.

In a mobile communication system with a frequency reuse factor of 1, mobility is mostly achieved between different cells on the same frequency band. Accordingly, for insuring better mobility of the user equipment, the user equipment should be able to measure better the cell information and quality of neighboring cells having the same center frequency as the center frequency of the serving cell. As such, measurement on the cells having the same center frequency as the center frequency of the serving cell is referred to as intra-cell measurement. The user equipment performs the intra-cell measurement and reports a measurement result to the network at a proper time so that the goal of the corresponding measurement result may be achieved.

A mobile communication service provider may operate the network using a plurality of frequency bands. In case a communication system service is provided through a plurality of frequency bands, the user equipment should be able to conduct better measurement on the cell information and quality of neighboring cells having center frequencies different from the center frequency of the serving cell so as to guarantee the optimal mobility for the user equipment. As such, the measurement on cells having a different center frequency from the center frequency of the serving cell is referred to as inter-cell measurement. The user equipment should be able to perform the inter-cell measurement and should be able to report a measurement result to the network at a proper time.

In case the user equipment applies for measurement on a heterogeneous network, it may also conduct measurement on a cell in the heterogeneous network in accordance with a configuration of the base station. Such measurement on the heterogeneous network is referred to as inter-Radio Access Technology (RAT) measurement. For example, RAT may include UMTS Terrestrial Radio Access Network (UTRAN) and GSM EDGE Radio Access Network (GERAN) that follow the 3GPP standards and may also include CDMA2000 system following the 3GPP2 standards.

Hereinafter, a process of selecting a cell by the user equipment is described in detail with reference to 3GPP TS 36.304 V8.8.0 (2009-12) "User Equipment (UE) procedures in idle mode (Release 8)".

After the user equipment once selects some cell through a cell selection process, the strength or quality of signals between the user equipment and the base station may vary due to a change in mobility of the user equipment or radio environment. Accordingly, in case the quality of the selected cell is deteriorated, the user equipment may select another cell providing better quality. When selecting a cell again, the user equipment generally selects a cell providing better signal quality than that provided by the currently selected cell. Such process is referred to as cell reselection. The cell reselection process, in the point of view of quality of radio signals, basically aims to choose a cell providing the best quality to the user equipment.

Besides the point of view of quality of radio signals, the network may determine a priority per frequency and may provide the priority to the user equipment. The user equipment receives the priority and considers the priority in preference to the radio signal quality condition in the cell reselection process.

As such, there is a method of selecting or reselecting a cell depending on signal characteristics in the radio environment, and in selecting a cell for reselection when doing cell reselection, the following cell reselection methods may be present according to the RAT of the cell and frequency characteristics.

intra-frequency cell reselection: reselects a cell having the same center frequency and the same RAT as a cell where the user equipment is camping.
inter-frequency cell reselection: reselects a cell having the same RAT and a different center frequency from a cell where the user equipment is camping.
inter-RAT cell reselection: reselects a cell using a RAT different from a RAT where the user equipment is camping.

The cell reselection process is as follows.

First, the user equipment receives a parameter for cell reselection from the base station.

Second, the user equipment measures quality of a serving cell and a neighboring cell to make the cell reselection.

Third, the cell reselection is performed based on cell reselection criteria. The cell reselection criteria have the following characteristics in relation to the measurement of the serving cell and the neighboring cell.

The intra-frequency cell reselection is basically based on ranking. The "ranking" is a process of defining index values for evaluating cell reselection and numbering the cells according to size of the index values. The cell having the best index is often called "best ranked cell." Cell index values are values obtained by, as necessary, applying a frequency offset or cell offset to values measured on the corresponding cell by the user equipment.

The inter-frequency cell reselection is based on the frequency priority order provided by the network. The user equipment attempts to camp on the frequency having the highest frequency priority. The network provides a frequency priority order that is jointly applicable to all the user equipment in the cell through broadcast signaling and may provide a per-frequency priority to each user equipment through per-user equipment signaling (dedicated signaling).

For the inter-frequency cell reselection, the network may provide parameters (e.g., frequency-specific offset) used for cell reselection to the user equipment per frequency.

For the intra-frequency cell reselection or inter-frequency cell reselection, the network may provide the user equipment with a neighboring cell list (NCL) used for cell reselection. This NCL includes per-cell parameters (for example, cell-specific offset) used for cell reselection.

For the intra-frequency or inter-frequency cell reselection, the network may is provide the user equipment with a cell reselection black list used for cell reselection. The user equipment may not perform cell reselection on the cells included in the black list.

Subsequently, ranking which is done during the course of cell reselection evaluation is described.

The ranking criterion used to provide a priority of a cell is defined in Equation 1:

$$R_s = Q_{meas,s} + Q_{hyst}, R_n = Q_{meas,n} - Q_{offset} \qquad \text{[Equation 1]}$$

Here, Rs is a ranking criterion of a serving cell, Rn a ranking criterion of a neighboring cell, Qmeas,s a quality value measured on a serving cell by the user equipment, Qmeas,n a quality value measured on a neighboring cell by the user equipment, Qhyst a hysteresis value for ranking, and Qoffset an offset value between two cells.

In case of intra-frequency, when the user equipment receives an offset (Qoffset,n) between the serving cell and the neighboring cell, Qffoset=Qoffsets,n. And, when the user equipment does not receive Qoffsets,n, Qoffset=0.

In case of inter-frequency, when the user equipment receives an offset (Qoffsets,n) for the corresponding cell, Qoffset=Qoffsets,n+Qfrequency. And, when the user equipment does not receives Qoffsets,n, Qoffset=Qfrequency.

If the ranking criterion (Rs) of the serving cell and the ranking criterion (Rn) of the neighboring cell vary while they are similar to each other, such variation causes the ranking order to keep changing, so that the user equipment may alternately reselect the two cells. Qhyst is a parameter that provides a hysteresis in cell reselection to prevent the user equipment from making alternate reselection on the two cells.

The user equipment measures Rs of the serving cell and Rn of the neighboring cell according to the above equation and considers the cell having the largest ranking criterion value as the best ranked cell, reselecting this cell.

The above criteria show that the cell quality acts as the most critical criterion in cell reselection. If the reselected cell is not a suitable cell, the user equipment excludes the corresponding frequency or cell from the targets for cell reselection.

Serving cells may be divided into a primary cell and a secondary cell. The primary cell is a cell that operates at a primary frequency, performs an initial connection establishing process of user equipment, or initiates a connection reestablishing process or is a cell designated as the primary cell during the course of handover. The primary cell is also referred to as reference cell. The secondary cell operates at a secondary frequency, may be configured after RRC connection is established, and may be used to provide an additional radio resource. At least one primary cell is always set, and a secondary cell may be added/modified/released by upper layer signaling (e.g., RRC message).

Figure 4:
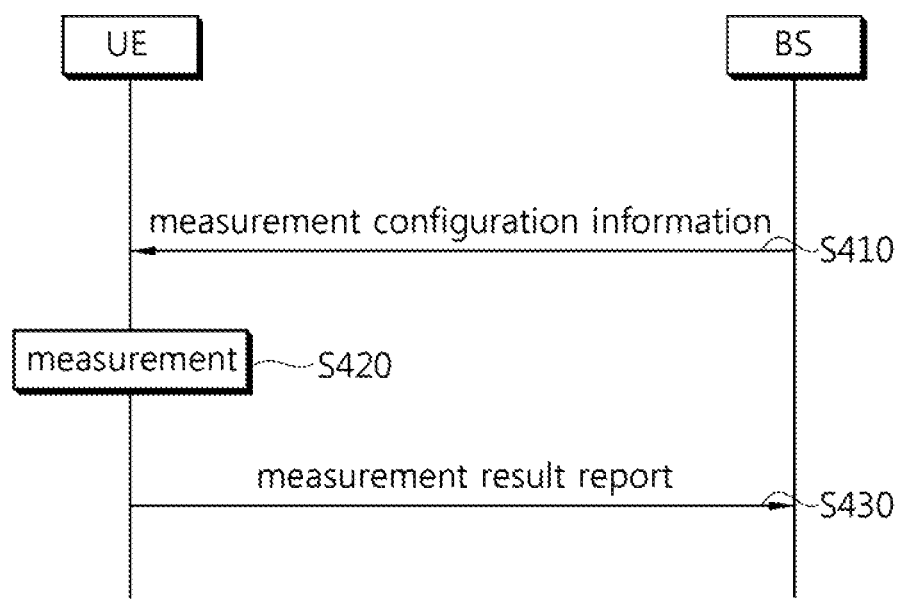
FIG. 4 is a flowchart illustrating an existing method of performing measurement.

FIG. 4 is a flowchart illustrating an existing method of performing measurement.

The user equipment receives measurement configuration information from the base station (S410). A message including the measurement configuration information is referred to as a measurement configuration message. The user equipment performs measurement based on the measurement configuration information (S420). The user equipment, if the measurement result satisfies a reporting condition in the measurement configuration information, then reports the measurement result to the base station (S430). A message including the measurement result is referred to as a measurement report message.

The measurement configuration information may include the following information.

(1) measurement object information: information regarding an object on which the user equipment is to perform measurement. The measurement object includes at least one of an infra-frequency measurement object that is an object for intra-cell measurement, an inter-frequency measurement object that is an object for inter-cell measurement, and an inter-RAT measurement object that is an object for inter-RAT measurement. For example, the intra-frequency measurement object indicates a neighboring cell having the same frequency band as the serving cell, the inter-frequency measurement object indicates a neighboring cell having a frequency band different from that of the serving cell, and the inter-RAT measurement object may indicate a neighboring cell of an RAT different from the RAT of the serving cell.

(2) reporting configuration information: information regarding the reporting condition and reporting type associated with when the user equipment is to report the measurement result. The reporting condition may include information regarding an event or period in which the report of the measurement result is triggered. The reporting type is information regarding the type of measurement result, which is to be configured.

(3) measurement identity information: information regarding a measurement identity that associates the measurement object and the reporting configuration with each other so that the user equipment may determine to report what measurement object in what type. The measurement identity information is included in the measurement reporting message and may indicate what measurement object the measurement result is about and in what reporting condition the measurement result is generated.

(4) quantity configuration information: information regarding parameters for configuring filtering of measurement basis, reporting basis, and/or measurement result values.

(5) measurement gap information: information regarding a measurement gap that is a section, which may be used only for measurement without the user equipment considering data transmission with the serving cell because downlink transmission or uplink transmission is not scheduled.

The user equipment has a measurement object list, a measurement report configuration list, and a measurement identity list to perform a measurement process.

In 3GPP LTE, the base station may configure only a single measurement object for one frequency band in the user equipment. Pursuant to Chapter 5.5.4, 3GPP TS 36.331 V8.5.0 (2009-03) "Evolved Universal Terrestrial Radio Access (E-UTRA) Radio Resource Control (RRC); Protocol specification (Release 8)", events in which measurement report is triggered are defined as in the following table:

TABLE 1

| Events | Reporting conditions |
|---|---|
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

If the measurement result of the user equipment satisfies the configured events, the user equipment transmits a measurement report message to the base station.

Figure 5:
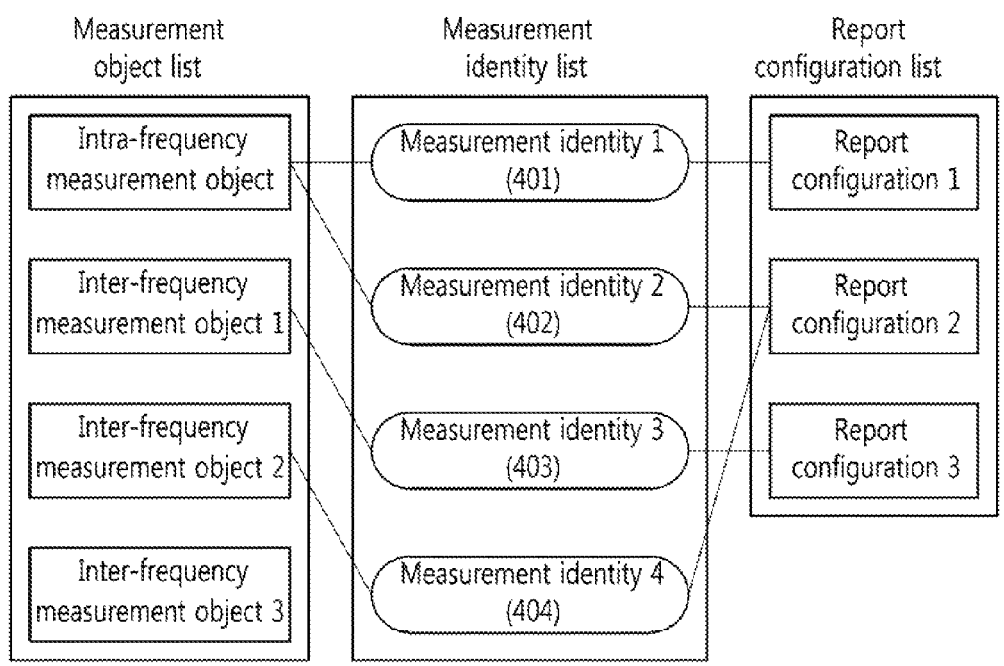
FIG. 5 shows an example of a measurement configuration made to user equipment.

FIG. 5 shows an example of a measurement configuration configured in user equipment.

First, measurement identity 1 401 connects the intra-frequency measurement object with reporting configuration 1. The user equipment performs intra frequency measurement, and reporting configuration 1 is used to determine the reference of the measurement result report and reporting type.

Measurement identity 2 402, like measurement identity 1 401, is connected with the intra-frequency measurement object, but connects the intra-frequency measurement object with report configuration 2. The user equipment performs intra-cell measurement, and reporting configuration 2 is used to determine the reference of measurement result report and reporting type.

By measurement identity 1 401 and measurement identity 2 402, the user equipment transmits the measurement result only if the measurement result for the intra-frequency measurement object satisfies either reporting configuration 1 or reporting configuration 2.

Measurement identity 3 403 connects inter-frequency measurement object 1 with reporting configuration 3. The user equipment reports the measurement result when the measurement result for inter-frequency measurement object 1 satisfies a reporting condition included in reporting configuration 1.

Measurement identity 4 404 connects inter-frequency measurement object 2 with reporting configuration 2. If the measurement result for the inter-frequency measurement object 2 satisfies a reporting condition included in reporting configuration 2, the user equipment reports the measurement result.

Meanwhile, the measurement object, the reporting configuration, and/or measurement identity may be added, changed, and/or deleted. This may be indicated by the base station sending a new measurement configuration message or a measurement configuration changing message to the user equipment.

Figure 6:
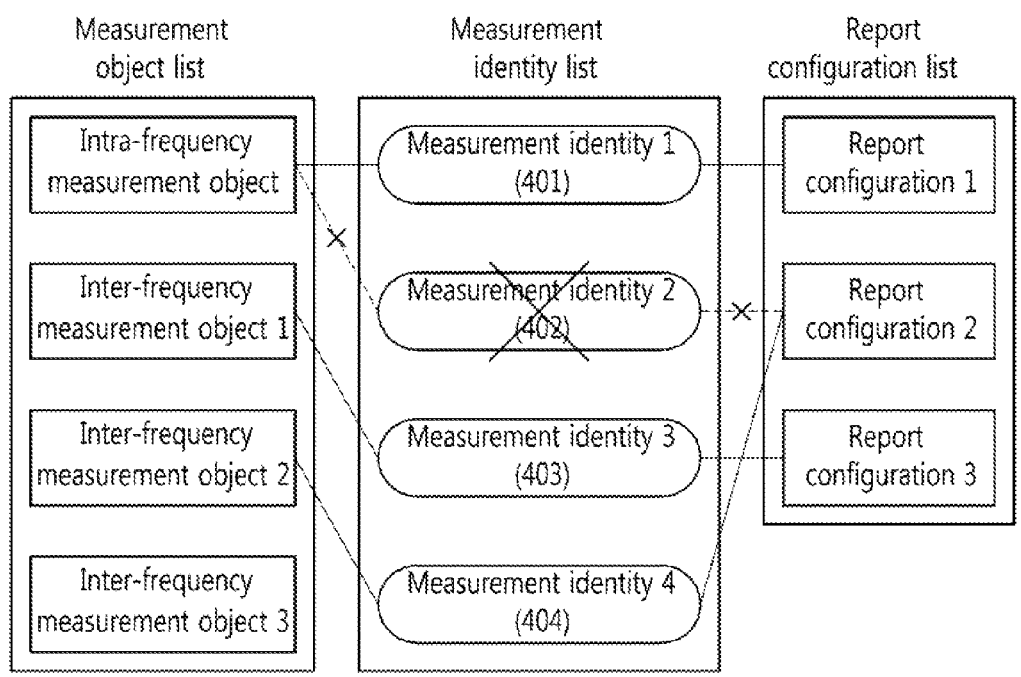
FIG. 6 shows an example of deleting a measurement identity.

FIG. 6 shows an example of deleting a measurement identity. If measurement identity 2 402 is deleted, measurement on the measurement object associated with measurement identity 2 402 is terminated nor is the measurement result transmitted. The measurement object or reporting configuration associated with the deleted measurement identity may not be changed.

Figure 7:
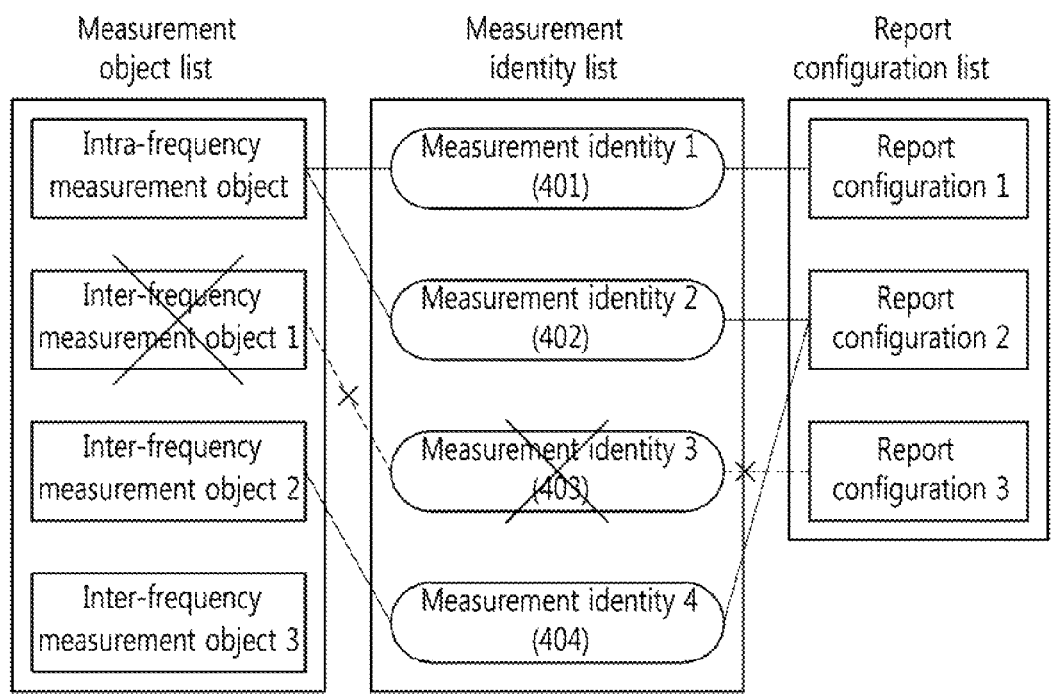
FIG. 7 shows an example of deleting a measurement object.

FIG. 7 shows an example of deleting a measurement object. If inter-frequency measurement object 1 is deleted, the user equipment deletes measurement identity 3 403 as well. Measurement on inter-frequency measurement object 1 is terminated and no measurement result is transmitted. However, the reporting configuration associated with the deleted inter-frequency measurement object 1 may not be varied or deleted.

If the reporting configuration is removed, the user equipment also removes an associated measurement identity. The user equipment terminates measurement on the associated measurement object by the associated measurement identity. However, the measurement object associated with the deleted reporting configuration may not be varied or deleted.

The user equipment receives a measurement configuration and then performs measurement on the measurement configuration associated with the measurement identity. The user equipment estimates whether the measurement result satisfies the measurement result condition based on the reporting configuration included in the measurement configuration. If it satisfies the reporting reference included in the reporting configuration, the user equipment transmits a measurement reporting message including the measurement reporting information to the network.

The measurement report message includes the following information.
  measurement identity: measurement identity associated with a reporting configuration satisfying the reporting reference. The network may be aware of a reference on which the measurement report received from the user equipment through this measurement identity is based on.
  quality value of measured serving cell: quality value of the serving cell as measured by the user equipment.
  information of the measured neighboring cell: measurement identity of the neighboring cell as measured by the user equipment. This information includes an neighboring cell identity and quality value of the neighboring cell. The neighboring cell identity is a physical cell identity of the neighboring cell that satisfies the reporting reference. The quality value of the neighboring cell is a quality value of the neighboring cell that satisfies the reporting reference.

ICIC (Inter-cell Interference Coordination) is now described.

ICIC is a task that operates radio resources to maintain control of inter-cell interference. The ICIC mechanism may be divided into frequency domain ICIC and time domain ICIC. ICIC includes multi-cell Radio Resource Management (RRM) functions that need consideration of information from the multi-cell.

An interfering cell is a cell that causes interference. The interfering cell is also referred to as aggressor cell.

An interfered cell is a cell that is interfered by the interfering cell. The interfered cell is also referred to as victim cell.

The frequency domain ICIC coordinates use of frequency domain resources (e.g., Resource Block (RB)) between multi-cells.

The time domain ICIC coordinates time domain resources (e.g., sub-frame) between multi-cells. For the time domain ICIC, OAM (Operations, Administration and Maintenance) configuration, which is called ABS (Almost Blank Subframe) pattern, may be used. In the interfering cell, the ABS is used to protect resources in the sub-frame of the interfered cell receiving strong inter-cell interference. The ABS is a sub-frame having reduced transmission power (or zero transmission power) over the physical channel or having decreased activity.

An ABS-based pattern is provided to the user equipment and restricts user equipment measurement. This is referred to as "measurement resource restriction." The ABS pattern refers to information indicating which sub-frame is ABS in one or more radio frames.

Depending on the measured cell (e.g., serving cell or neighboring cell) and measurement type (e.g., Radio Resource Management (RRM), Radio Link Monitoring (RLM), Channel State Information CSI)), three measurement resource restriction patters are present.

'ABS pattern 1' is used to restrict RRM/RLM measurement resources of the serving cell. Information on ABS pattern 1 may be provided from the base station to the user equipment when RB is configured/modified/released or when MAC/PHY configurations are modified.

'ABS pattern 2' is used to restrict RRM measurement resources of the neighboring cell operating at the same frequency as the serving cell. Accordingly, ABS pattern 2 may provide a list of neighboring cells to be measured, together with the pattern information, to the user equipment. ABS pattern 2 may be included in a measurement configuration for a measurement object.

'ABS pattern 3' is used to restrict resources for CSI measurement of the serving cell. ABS pattern 3 may be included in a message configuring CSI report.

For purposes of ICIC, two scenarios, CSG scenario and pico scenario, are being considered.

Figure 8:
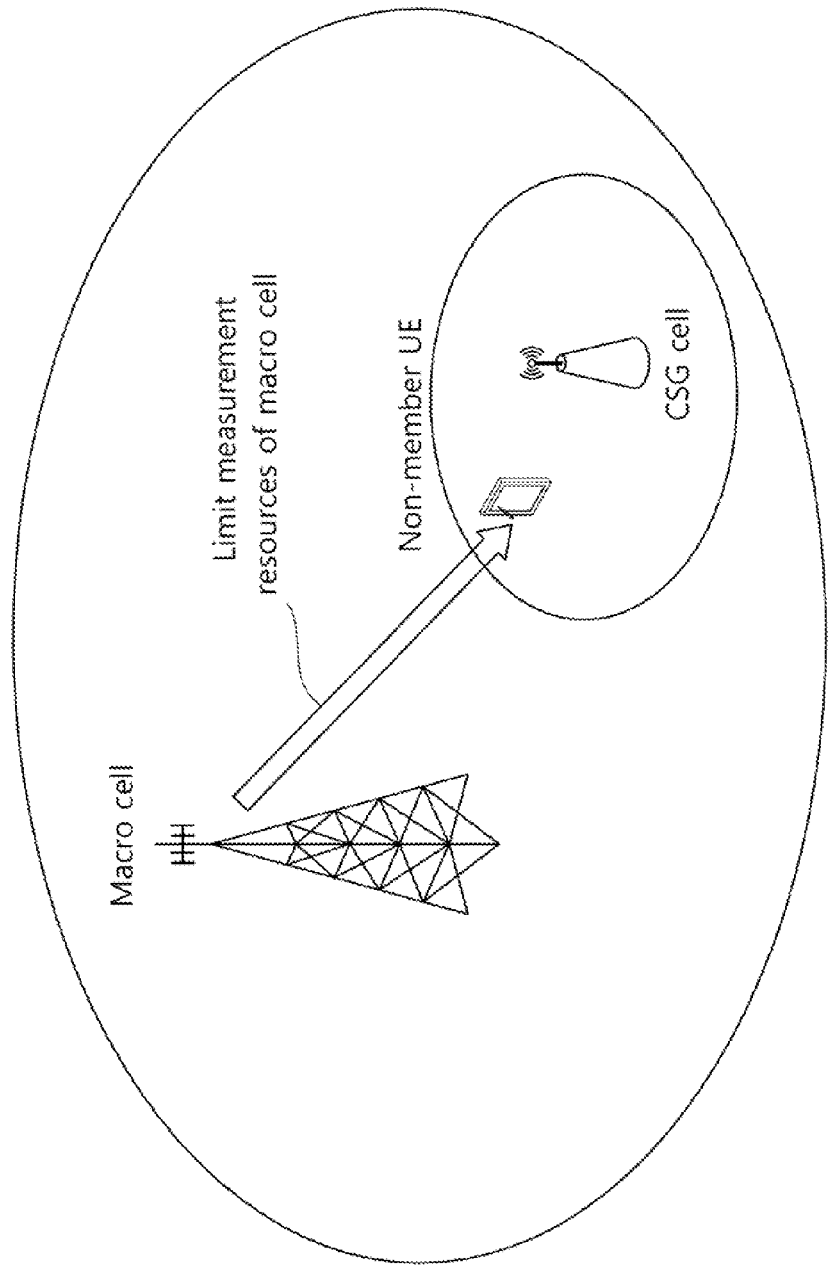
FIG. 8 shows an example of the CSG scenario.

FIG. 8 shows an example of the CSG scenario.

The CSG cell means a cell which only specific subscribers may access. The non-member user equipment is not a member of the CSG cell and is not allowed to access the CSG cell. A CSG cell that the user equipment cannot access is referred to as non-member CSG cell. The macro cell is a serving cell of non-member user equipment. The CSG cell wholly or partially overlaps the macro cell in light of coverage.

A main interference condition occurs when the non-member user equipment is positioned in close proximity to the CSG cell. In the point of view of the non-member user equipment, the CSG cell is an interfering cell, and the macro cell is an interfered cell. The time domain ICIC is used to allow the non-member user equipment to keep receiving a service in the macro cell.

In the RRC connected state, when finding that the non-member user equipment is under strong interference from the CSG cell, the network may configure a measurement resource restriction. Further, to facilitate mobility from the macro cell, the network may configure an RRM measurement resource restriction on the neighboring cell. If the user equipment is not strongly interfered from the CSG cell any more, the network may release the RRM/RLM/CSI measurement resource restrictions.

The user equipment may use a measurement resource restriction configured for RRM, RLM and CSI measurement. That is, the resources for RLM may be used in ABS, and measurement for RLM and CSI measurement may be conducted in the ABS.

The network may configure the CSG cell not to use low interference radio resources according to the configured measurement resource restriction. In other words, the CSG cell may not transmit or receive data in the ABS.

FIG. 8 shows an example of the pico scenario.

The pico cell is a serving cell of pico user equipment. The pico cell overlaps part or whole of the macro cell in light of coverage. The pico cell may generally have smaller coverage than that of the macro cell, but is not limited thereto.

A main interference condition takes place when the pico user equipment is placed at an edge of the pico serving cell. In the position of the pico cell, the macro cell is an interfering cell, and the pico cell is an interfered cell. The time domain ICIC is used for the pico cell to be able to keep receiving a service in the pico cell.

Upon finding that the pico user equipment is under strong interference from the macro cell, the pico cell may configure a measurement resource restriction on the corresponding user equipment.

The pico user equipment may use low interference radio resources based on the measurement resource restriction configured for RRM, RLM, and CSI measurement. In other words, the resources for RLM are used in the ABS, and measurement for RLM and CSI measurement may be conducted in the ABS. When the pico cell is strongly interfered by the macro cell, if the RRM/RLM/CSI measurement is fulfilled in the ABS, more correct measurement may be possible.

Further, if the user equipment using the macro cell as a serving cell performs measurement on the neighboring cell in the ABS, user equipment's mobility from the macro cell to the pico cell may be more easily done.

The user equipment performs RRM measurement such as Reference Signal Received Power (RSRP), Reference Signal Received Quality (RSRQ) and quality measurement such as Channel Quality Indicator (CQI) and path-loss measurement on the serving cell or neighboring cell. Further, the user equipment may conduct measurement objecting Radio Link Monitoring (RLM) to monitor connection with the serving cell.

Depending on an object the user equipment tries to perform measure on, a cell causing interference (interfering cell) and a cell damaged by the interference (victim cell) are determined.

In case the user equipment measures the serving cell, an intra-frequency neighboring cell having a strong signal, which is positioned near the user equipment, may act as interference in measuring the serving cell. In such case, the user equipment may be highly interfered by the neighboring cell in measuring the serving cell.

In case the user equipment measures an intra-frequency neighboring cell, signals from the serving cell and another intra-frequency neighboring cell may interfere with measurement on the intra-frequency neighboring cell. In such case, the user equipment may be highly interfered by the other neighboring cell having the serving frequency and the serving cell in measuring the neighboring cell.

In case the serving cell may be aware of information on the measurement resource restriction that is applied by the neighboring cell interfering with the user equipment to suppress interference, the serving cell may allow the user equipment being interfered to perform restricted measurement based on the measurement resource restriction. The serving cell may provide services to the user equipment despite the interference from the neighboring cell through scheduling utilizing the low-interference radio resource.

Meanwhile, in some cases, the serving cell may not be aware of whether the interfering cell operates a low-interference radio resource and/or how the restricted radio resource is configured. As an example, the user equipment attached to the macro cell may be highly interfered by a CSG cell which is inaccessible CSG cell (e.g., non-member femto cell). In such situation, if the CSG cell is installed in an uncoordinated form, the macro cell may not be directly aware of the configuration information of the CSG cell. In such case, there is a need for a method in which the user equipment temporarily accesses the inaccessible CSG cell to obtain information and reports it to the serving cell so as to support the restricted measurement of the user equipment.

Figure 10:
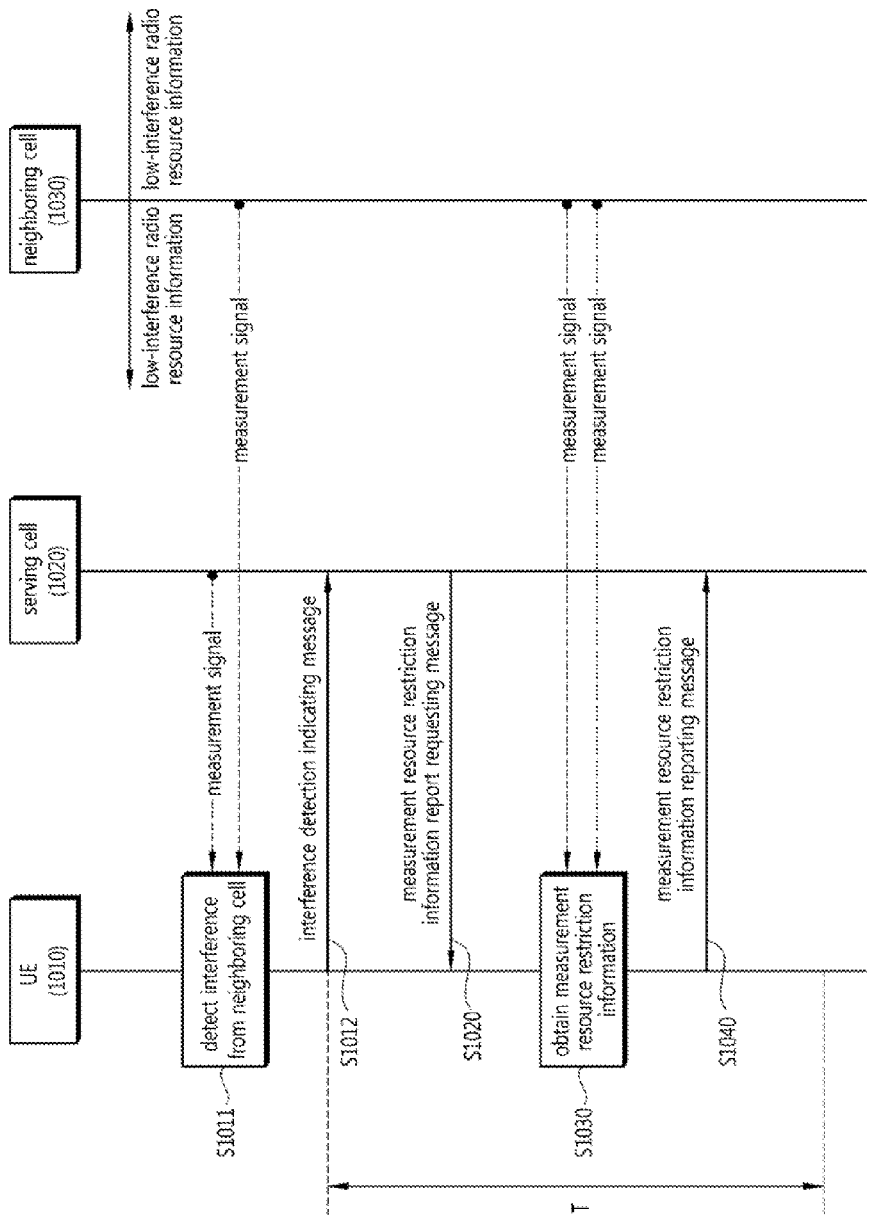
FIG. 10 is a flowchart illustrating a measurement method by user equipment according to an embodiment of the present invention.

FIG. 10 is a flowchart illustrating a measurement method according to an embodiment of the present invention.

Referring to FIG. 10, a neighboring cell 1030 that may cause interference operates a low-interference radio resource and broadcasts information thereon (S1010). The low-interference radio resource information is included in the system information and may be broadcast.

The low-interference radio resource information is a resource by which the interfering cell minimizes transmission/reception and radio signals, and the level of interference caused by the interfering cell to the interfered cell may be relatively low. A specific radio resource having a relatively low interference level may mean a specific time pattern in which interference generated from the cell to another cell is temporally low. Accordingly, the low-interference radio resource may be specified by an ABS pattern operated by the interfering cell. The low-interference radio resource information is related to an applied ABS pattern may be period indicating information of the ABS pattern and information indicating whether in the ABS pattern each unit time section (subframe) is an ABS. The information indicating whether each unit time section is an ABS may be configured in a bitmap type.

Meanwhile, the low-interference radio resource may be information regarding a specific frequency band where interference caused by the neighboring cell 1030 is low.

The user equipment 1010, when detecting interference from a specific neighboring cell (S1011), then transmits a message indicating that it has detected interference from the neighboring cell to the serving cell 1020 (S1012). The interference detection indicating message may include, as information regarding the interfering cell, information on a cell indicator of the corresponding cell or information on a frequency used by the corresponding cell.

The serving cell 1020 receives the interference detection indicating message and transmits a measurement resource restriction information report requesting message to the user equipment 1010 in order to instruct the user equipment to report information relating to the measurement resource restriction (S1020). The measurement resource restriction information requesting message is may include a report object indicator indicating a measurement resource restriction information report request, an identity of the neighboring cell 1030 causing interference, frequency of the neighboring cell 1030, information relating to a list of information to be included in the report message by the user equipment 1010, and information indicating the maximum time that may be used for the user equipment 1010 to receive information relating to the measurement resource restriction configured by the neighboring cell 1030.

The measurement resource restriction information report request may be transmitted to the user equipment 1010 by the serving cell 1020 transmitting a measurement configuration message including the report object indicator or another downlink RRC message including the report object indicator. Further, the serving cell 1020 may transmit a measurement resource restriction information report requesting message, which is a message independently defined, to the user equipment 1010.

The user equipment 1010, when receiving the measurement resource restriction information report requesting message from the serving cell 1020, then receives system information of the neighboring cell 1030 and attempts to obtain the measurement resource restriction information (S1030).

The user equipment 1010 may determine a method of receiving system information and a method of determining a neighboring cell to obtain the measurement resource restriction information in accordance with the information included in the measurement resource restriction information report requesting message.

If the message includes the identity of the specific neighboring cell but not the frequency information, the user equipment 1010 receives the system information of the neighboring cell indicated by the cell identity at the frequency of the serving cell 1020, thereby attempting to obtain the measurement resource restriction information.

If the message includes the identity of the specific neighboring cell and the frequency information, the user equipment 1010 receives the system information of the neighboring cell indicated by the cell identity at the indicated frequency and attempts to obtain the measurement resource restriction information.

If the message does not include the identity of the specific neighboring cell but includes the frequency information, the user equipment 1010 may find a neighboring cell broadcasting the measurement resource restriction information among neighboring cells using the corresponding frequency and may attempt to obtain the measurement resource restriction information.

If the message does not include the identity of the specific neighboring cell and the frequency information, the user equipment finds a neighboring cell broadcasting the measurement resource restriction information among neighboring cells using the frequency of the serving cell and may attempt to obtain the measurement resource restriction information. The measurement resource restriction information may be low-interference radio resource information transmitted from the specific neighboring cell, and the low-interference radio resource information may include the ABS pattern-related information as described above.

The user equipment 1010 obtains the measurement resource restriction information and transmits a measurement resource restriction information reporting message to the serving cell 1020 (S1040).

The reporting message includes the measurement resource restriction information obtained by the user equipment, the cell identity of the neighboring cell that has transmit the measurement resource restriction information, RSRP and/or RSRQ measured values for the serving cell and the corresponding neighboring cell, cell type of the neighboring cell that has transmit the measurement resource restriction information, and in case the neighboring cell which has transmit the measurement resource restriction information is a CSG cell, information indicating whether the user equipment is member user equipment. The cell identity may be a physical layer identity. If the user equipment 1010 obtains a global cell ID of the corresponding neighboring cell by receiving the system information, the user equipment may include the global cell ID in the report message as the cell identity. The cell type may be a normal cell, a hybrid cell or a CSG cell. Additionally, in case a list of neighboring cells to which the measurement resource restriction is to be applied is included in the system information when the system information is transmitted, the user equipment may include the neighboring cell list in the reporting message and may further include information corresponding to information requesting that report be made in the measurement resource restriction information report requesting message.

Meanwhile, if the user equipment 1010 fails to obtain the measurement resource restriction information including the low-interference radio resource information from the neighboring cell within a designated time T, the user equipment 1010 may transmit the reporting message to the serving cell 1020, with the reason why the user equipment 1010 has failed to obtain the measurement resource restriction information included in the reporting message. The designated time may be an available time included in the measurement resource restriction information report requesting message or a specific time value predetermined between the user equipment and the network.

The reasons for the failure in obtaining may be one of when the corresponding neighboring cell is not identified, when the neighboring cell is identified but obtaining the system information fails, when the system information on success in identifying the neighboring cell is obtained but the neighboring cell does not transmit the measurement resource restriction information including the low-interference radio resource information, and when the neighboring cell is identified and system information is obtained, but the neighboring cell does not configure the measurement resource restriction.

The serving cell 1020, when receiving the measurement resource restriction information reporting message from the user equipment 1010, may configure the measurement resource restriction in the user equipment 1010 based on the measurement resource restriction information included in the measurement resource restriction information reporting message. The serving cell 1020 may configure the measurement resource restriction reflecting the low-interference radio resource information of the neighboring cell.

The user equipment 1010 may perform RRM measurement such as RSRP or RSRQ, channel status information measurement such as CQI, and path-loss measurement depending on the restricted measurement resource. The measurement of the user equipment may further include measurement for purposes of RLM to monitor connection with the serving cell 1020.

The serving cell 1020 may provide services to the user equipment 1010 through the low-interference radio resource depending on the measurement resource restriction information.

Meanwhile, in the embodiment illustrated in FIG. 10, the user equipment 1010, when receiving the report requesting message from the serving cell 1020, may obtain the measurement resource restriction information and reports it to the serving cell 1020. However, as necessary, the user equipment 1010 may obtain the measurement resource restriction information of the neighboring cell without receiving the requesting message and may report it. As an example, if the user equipment senses the user equipment being highly interfered from the neighboring cell, the user equipment may obtain the measurement resource restriction information based on the system information of the neighboring cell and then may immediately report it to the neighboring cell 1030.

In the embodiment described above in connection with FIG. 10, the serving cell which is not aware of information on the measurement resource restriction configured by the neighboring cell, receives an interference detection indicating message from the user equipment and then requests that the user equipment obtain the measurement resource restriction information. The serving cell receives the measurement resource restriction information from the user equipment and allows the user equipment to perform restricted measurement so that the measurement of the user equipment may be conducted normally. Further, the serving cell may provide services to the user equipment through low-interference radio resources according to measurement resource restriction information without interruption due to interference.

Figure 11:
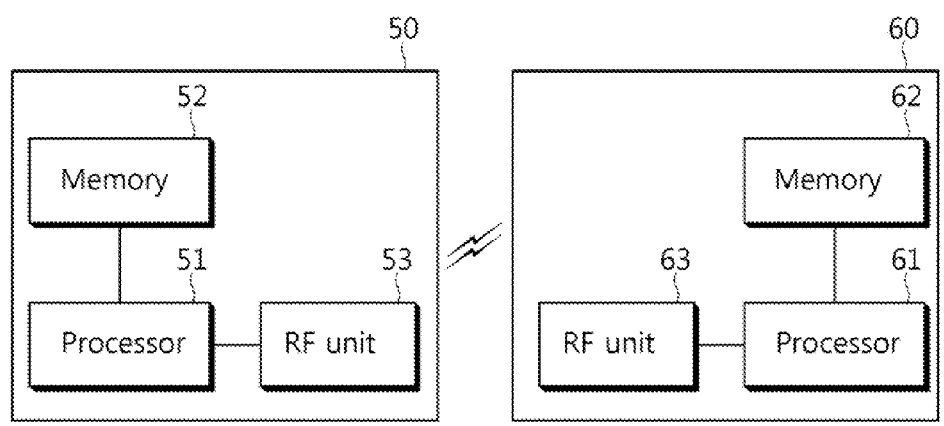
FIG. 11 is a block diagram illustrating a wireless communication system in which an embodiment of the present invention is implemented.

FIG. 11 is a block diagram illustrating a wireless communication system in which an embodiment of the present invention is implemented.

Figure 9:
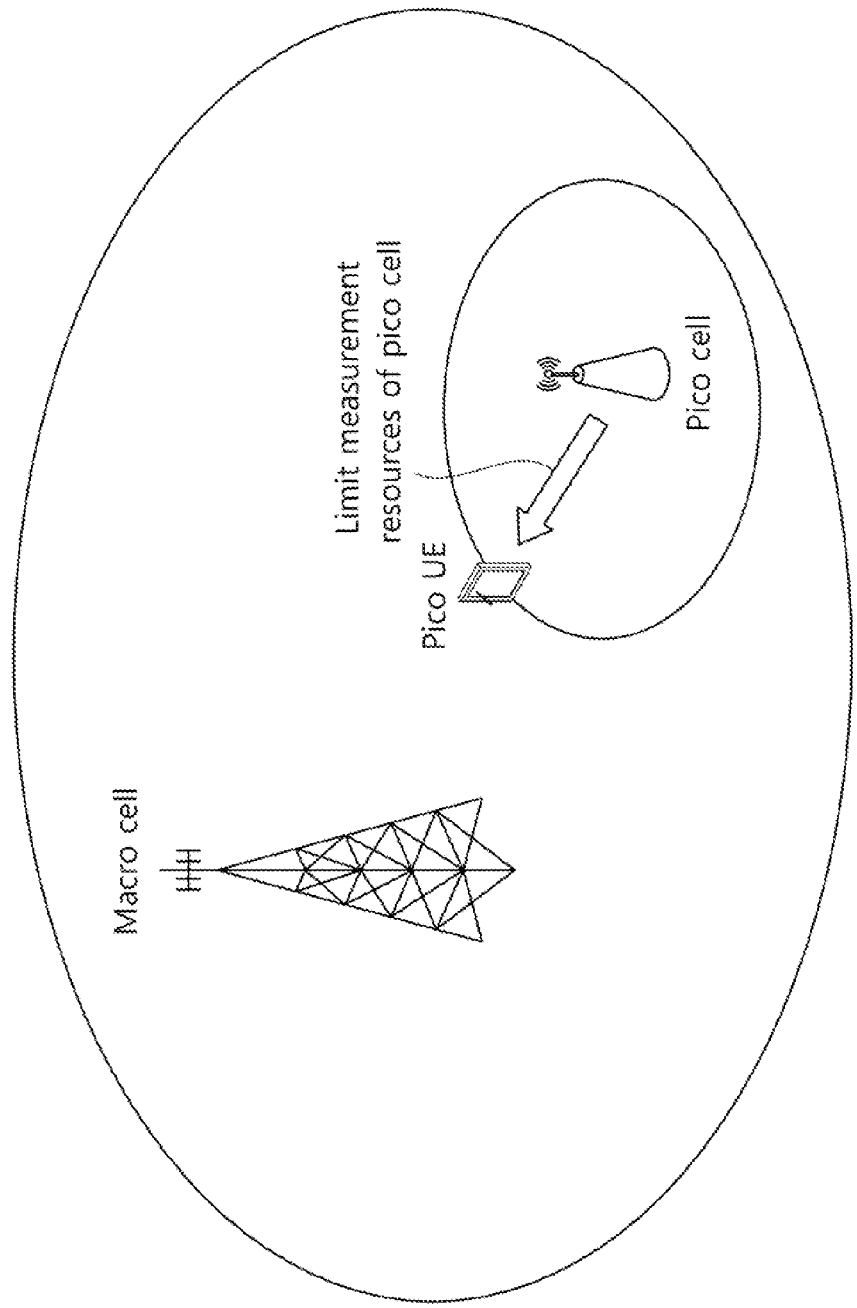
FIG. 9 shows an example of the pico scenario.

The base station 50 includes a processor 51, a memory 52, and an RF (Radio Frequency) unit 53. The memory 52 is connected to the processor 51 and stores various information for driving the processor 51. The RF unit 53 is connected to the processor 51 and transmits and/or receives radio signals. The processor 51 implements suggested functions, procedures, and/or methods. The operation of the base station 50 configuring a cell in the embodiments illustrated in FIGS. 7 to 9 may be implemented by the processor 51.

The user equipment 60 includes a processor 61, a memory 62, and an RF unit 63. The memory 62 is connected to the processor 61 and stores various information for driving the processor 61. The RF unit 63 is connected to the processor 61 and transmits and/or receives radio signals. The processor 61 implements suggested functions, procedures, and/or methods. The operation of the user equipment 60 in the embodiments illustrated in FIGS. 9 to 11 may be implemented by the processor 61.

The processor may include an ASIC (Application-Specific Integrated Circuit), other chipsets, logic circuits and/or data processing devices. The memory may include a ROM (Read-Only Memory), a RAM (Random Access Memory), a flash memory, a memory card, a storage medium and/or other storage devices. The RF unit may include a baseband circuit for processing radio signals. When the embodiments are implemented in software, the above-described schemes may be embodied in modules (procedures, functions, etc.) performing the above-described functions. The modules may be stored in the memory and may be executed by the processor. The memory may be positioned in or outside the processor and may be connected to the processor by various known means.

Although in the above-described exemplary systems, methods are described based on flowcharts including a series of steps or blocks, the present invention is not limited to the order of the steps, and some steps may be performed in a different order of other steps or simultaneously with other steps. It will be understood by one of ordinary skill that one or more steps in a flowchart may be is deleted without affecting the scope of the invention.

The invention claimed is:

1. A method of performing measurement by a user equipment in a wireless communication system, the method comprising:
receiving a measurement resource restriction information report requesting message from a serving cell;
attempting to obtain measurement resource restriction information from a target neighboring cell;
if the measurement resource restriction information is successfully obtained, transmitting a measurement resource restriction information reporting message including the measurement resource restriction information to the serving cell;
receiving a measurement resource restriction configuration from the serving cell; and
performing a measurement based on the measurement resource restriction configuration,
wherein the measurement resource restriction information report requesting message includes:
at least cell identity of the target neighboring cell from which the user equipment attempts to obtain the measurement resource restriction information or a frequency indicator of the target neighboring cell; and
an obtaining time that may be used to obtain the measurement resource restriction information from a time when the user equipment receives the measurement resource restriction information report requesting message.

2. The method of claim 1, wherein, if the measurement resource restriction information report requesting message includes only the cell identity, attempting to obtain the measurement resource restriction information includes:
receiving system information of the target neighboring cell indicated by the cell identity at a frequency being used by the serving cell; and
obtaining the measurement resource restriction information included in the system information.

3. The method of claim 1, wherein, if the measurement resource restriction information report requesting message includes both the cell identity and the frequency indicator, attempting to obtain the measurement resource restriction information includes:
receiving system information of the target neighboring cell indicated by the cell identity at a frequency indicated by the frequency indicator; and
obtaining the measurement resource restriction information included in the system information.

4. The method of claim 1, wherein, if the measurement resource restriction information report requesting message includes only the frequency indicator, attempting to obtain the measurement resource restriction information includes:
receiving system information broadcast at a frequency indicated by the frequency indicator; and
obtaining the measurement resource restriction information included in the system information.

5. The method of claim 4, wherein the measurement resource restriction information reporting message includes:
a cell identity of the target neighboring cell that is a target from which the measurement resource restriction information is obtained;
a measured value for the target neighboring cell; and
a cell type of the target neighboring cell,
wherein if the cell type of the target neighboring cell is a CSG (Closed Subscriber Group) cell, the measurement resource restriction information reporting message further includes a member indicator indicating whether the user equipment is a member of the target neighboring cell.

6. The method of claim 1, wherein the measurement resource restriction information is successfully obtained within the obtaining time.

7. The method of claim 1, wherein the measurement resource restriction information includes information relating to a time pattern in which the target neighboring cell minimizes transmission and reception of radio signals.

8. The method of claim 7, wherein the time pattern is an ABS (Almost Blank Subframe) pattern formed on a per-subframe basis.

9. The method of claim 8, wherein the measurement resource restriction configuration includes the ABS pattern information.

10. The method of claim 9, wherein performing the measurement includes performing the measurement within a predetermined time section based on the ABS pattern information.

11. The method of claim 10, wherein performing the measurement includes performing an RLM (Radio Link Monitoring) measurement to monitor connectivity with the serving cell.

12. The method of claim 1, further comprising:
if the measurement resource restriction information is not successfully obtained, transmitting, to the serving cell, the measurement resource restriction information reporting message including information indicating a failure to obtain the measurement resource restriction information.

13. The method of claim 12, wherein the measurement resource restriction information is not successfully obtained when the measurement resource restriction information is not obtained within the obtaining time.

14. The method of claim 13, wherein the measurement resource restriction information reporting message further includes information indicating a reason why the measurement resource restriction information is not successfully obtained.

15. The method of claim 14, further comprising:
transmitting, to the serving cell, an interference detection indicating message indicating that interference caused from a neighboring cell is received,
wherein the measurement resource restriction information report requesting message is received from the serving cell in response to the interference detection indicating message.

16. An apparatus of performing measurement in a wireless communication system, the apparatus comprising:
an RF (Radio Frequency) unit transmitting and receiving a radio signal; and
a processor connected to the RF unit and configured to:
receive a measurement resource restriction information report requesting message from a serving cell;
attempt to obtain measurement resource restriction information from a target neighboring cell;
if the measurement resource restriction information is successfully obtained, transmit, to the serving cell, a measurement resource restriction information reporting message including the measurement resource restriction information;
receive measurement resource restriction configuration from the serving cell; and
perform a measurement based on the measurement resource restriction configuration,
wherein the measurement resource restriction information report requesting message includes:
at east a cell identity of the target neighboring cell from which the apparatus attempts to obtain the measurement resource restriction information or a frequency indicator of the target neighboring cell; and
an obtaining time that may be used to obtain the measurement resource restriction information from a time when the apparatus receives the measurement resource restriction information report requesting message.

17. The apparatus of claim 16, wherein, if the measurement resource restriction information report requesting message includes only the cell identity, the processor is further configured to attempt to obtain the measurement resource restriction information by:
receiving system information of the target neighboring cell indicated by the cell identity at a frequency being used by the serving cell; and
obtaining the measurement resource restriction information included in the system information.

18. The apparatus of claim 16, wherein, if the measurement resource restriction information report requesting message includes both the cell identity and the frequency indicator, the processor is further configured to attempt to obtain the measurement resource restriction information by:
receiving system information of the target neighboring cell indicated by the cell identity at a frequency indicated by the frequency indicator; and
obtaining the measurement resource restriction information included in the system information.

19. The apparatus of claim 16, wherein, if the measurement resource restriction information report requesting message includes only the frequency indicator, the processor is further configured to attempt to obtain the measurement resource restriction information by:
receiving system information broadcast at a frequency indicated by the frequency indicator; and
obtaining the measurement resource restriction information included in the system information.

* * * * *